United States Patent
Elgat et al.

(10) Patent No.: US 10,654,720 B2
(45) Date of Patent: May 19, 2020

(54) RECOVERING BROMINE FROM SOLID WASTE CONTAINING BROMINE COMPOUNDS, AND APPLICATIONS THEREOF

(71) Applicant: ELCON RECYCLING CENTER (2003) LTD, Haifa (IL)

(72) Inventors: Zvi Elgat, Maccabim-Reut (IL); Abraham Ben Menashe, Nahariya (IL)

(73) Assignee: Elcon Recycling Center (2003) Ltd., Neot Hovev (IL)

( * ) Notice: Subject to any disclaimer, the term of this patent is extended or adjusted under 35 U.S.C. 154(b) by 92 days.

(21) Appl. No.: 15/551,700

(22) PCT Filed: Feb. 18, 2016

(86) PCT No.: PCT/IB2016/050883
§ 371 (c)(1),
(2) Date: Aug. 17, 2017

(87) PCT Pub. No.: WO2016/132319
PCT Pub. Date: Aug. 25, 2016

(65) Prior Publication Data
US 2018/0022606 A1    Jan. 25, 2018

Related U.S. Application Data

(60) Provisional application No. 62/117,492, filed on Feb. 18, 2015.

(51) Int. Cl.
*C01B 7/09* (2006.01)
*B09B 3/00* (2006.01)
(Continued)

(52) U.S. Cl.
CPC ............ *C01B 7/096* (2013.01); *B01F 3/2284* (2013.01); *B01J 8/087* (2013.01); *B09B 3/0083* (2013.01);
(Continued)

(58) Field of Classification Search
CPC ............ B01F 2215/0042; B01F 3/2284; B01J 2219/00051; B01J 2219/00162;
(Continued)

(56) References Cited

U.S. PATENT DOCUMENTS 4,002,578 A * 1/1977 Csicsery ................ B01J 29/084
502/64
4,131,626 A * 12/1978 Sharma .................. C01B 7/096
423/502

(Continued)

FOREIGN PATENT DOCUMENTS

CN    101797573    8/2010
FR    2189310    1/1974
(Continued)

OTHER PUBLICATIONS

International Preliminary Report on Patentability dated Aug. 22, 2017 From the International Bureau of WIPO Re. Application No. PCT/IB2016/050883. (6 Pages).

(Continued)

*Primary Examiner* — Ngoc-Yen Nguyen

(57) ABSTRACT

Recovering bromine from solid waste containing bromine compounds, and applications thereof, such as for recovering bromine in a form suitable for reuse, or for manufacturing bromine salt (for example, calcium bromide). Bromine recovery method and system include: providing and mixing (i) solid waste containing bromine compounds and (ii) solid calcium hydroxide; heating the mixture in a chemical reducing (non-oxidizing) environment, thereby forming heated (Continued)

product consisting essentially of only solid calcium bromide (salt); and processing the heated product, to form bromine. Calcium bromide manufacturing method and system include: providing and mixing (i) solid waste containing bromine compounds and (ii) solid calcium hydroxide; heating the mixture in a chemical reducing (non-oxidizing) environment, thereby forming solid calcium bromide (salt). Applicable to processes of, or involving, manufacturing bromine-based flame (fire) retardant materials.

18 Claims, 4 Drawing Sheets

(51) Int. Cl.
| | |
|---|---|
| *B01F 3/22* | (2006.01) |
| *B01J 8/08* | (2006.01) |
| *C01F 11/34* | (2006.01) |
| *C01F 11/02* | (2006.01) |
| *C01F 3/00* | (2006.01) |
| *C01F 5/36* | (2006.01) |
| *C01F 11/04* | (2006.01) |

(52) U.S. Cl.
 CPC .................. *C01F 3/00* (2013.01); *C01F 5/36* (2013.01); *C01F 11/02* (2013.01); *C01F 11/04* (2013.01); *C01F 11/34* (2013.01); *B01F 2215/0042* (2013.01); *B01J 2219/00051* (2013.01); *B01J 2219/00162* (2013.01); *B01J 2219/00166* (2013.01)

(58) Field of Classification Search
 CPC ............. B01J 2219/00166; B01J 8/087; B09B 3/0083; C01B 7/096; C01F 11/34
 See application file for complete search history.

(56) References Cited

U.S. PATENT DOCUMENTS

| | | | | |
|---|---|---|---|---|
| 4,232,556 | A * | 11/1980 | Cole | A61B 8/00 73/626 |
| 4,348,307 | A * | 9/1982 | Noethe | C08G 18/2825 528/49 |
| 4,514,374 | A * | 4/1985 | Kirsch | C01F 11/34 423/491 |
| 2006/0231493 | A1* | 10/2006 | Procida | C01D 3/00 210/651 |
| 2012/0083542 | A1* | 4/2012 | Muller | C10G 1/002 521/47 |
| 2015/0158734 | A1* | 6/2015 | Ray | C01B 9/04 423/497 |

FOREIGN PATENT DOCUMENTS

| | | |
|---|---|---|
| FR | 2189310 A1 | 1/1974 |
| JP | 09-262565 | 10/1997 |
| JP | 10-245607 | 9/1998 |
| JP | 2000-119440 | 4/2000 |
| JP | 2002-226625 | 8/2002 |
| JP | 2002-226625 A | 8/2002 |
| WO | 2008/106346 A2 | 9/2008 |
| WO | WO 2008/106346 | 9/2008 |
| WO | 2013/043642 A2 | 3/2013 |
| WO | WO 2016/132319 | 8/2016 |

OTHER PUBLICATIONS

International Search Report and the Written Opinion dated May 30, 2016 From the International Searching Authority Re. Application No. PCT/IB2016/050883. (9 Pages).
Vehlow et al. "Recycling of Bromine From Plastics Containing Brominated Flame Retardants in State-of-the-Art Combustion Facilities", APME, Association of Plastics Manufacturers in Europe, XP002495114, p. 1-18, Jun. 2002. 4. Bromine Recycling Potential.
Vehlow et al. "Recycling of Bromine from Plastics Containing Brominated Flame Retardants in State-of-The-Art Combustion Facilities", Internet Citation dated Jun. 2002, APME, Bromine Recycling Potential, 20 Pages.
International Search Report received for PCT Patent Application No. PCT/IB2016/050883, dated May 30, 2016, 4 pages.
International Search Report received for PCT Patent Application No. PCT/IB2016/054819, dated Dec. 9, 2016, 4 pages.
Notification of Office Action dated Mar. 22, 2019 From The Patent Office of the People's Republic of China Re. Application No. 201680010786.2 and Its Translation Into English. (8 Pages).
Translation Dated Apr. 9, 2019 of Notification of Office Action dated Mar. 22, 2019 From The Patent Office of the People's Republic of China Re. Application No. 201680010786.2. (7 Pages).
Han et al. "Calcium Bromide", Fine Inorganic Manufacturing Technology, p. 522-524, Aug. 31, 2008.
Peng et al. "Process of Recovering Bromine From Waste Printed Circuit Boards", Journal of Safety and Environment, 10(1): 64-67, Feb. 2010. English Abstract.
Examination Report dated May 9, 2019 From the Australian Government, IP Australia Re. Application No. 2016221343. (2 Pages).
Notice of Reasons for Refusal dated Apr. 9, 2019 From the Japan Patent Office Re. Application No. 2017-544356 and Its Translation Into English. (9 Pages).
Luda et al. "Scavening of Halogen in Recycling of Halogen-Based Polymer Materials", Macromolecular Symposia, 180(1): 141-151, Mar. 2002.
Peng et al. "Fate of Bromine During the Pyrolysis of Waste Printed Circuit Board", Journal of Combustion Science and Technology, 15(2): 114-118, Apr. 2009. English Abstract.
Office Action dated May 20, 2019 From the Israel Patent Office Re. Application No. 253753 and Its Translation Into English. (4 Pages).
Notification of Office Action dated Sep. 29, 2019 From The State Intellectual Property Office of the People's Republic of China Re. Application No. 201680010786.2 and Its Translation Into English. (9 Pages).
Translation Dated Oct. 29, 2019 of Notification of Office Action dated Sep. 29, 2019 From The State Intellectual Property Office of the People's Republic of China Re. Application No. 201680010786. 2. (9 Pages).

* cited by examiner

FIG. 1A

*{Recovering bromine from solid waste containing bromine compounds.}*

100

104 — Providing the solid waste containing the bromine compounds. — 126a

108 — Providing a supply of solid calcium hydroxide. — 126b

112 — Mixing the solid waste and the solid calcium hydroxide, thereby forming a mixture thereof. — 126c 116 — Heating the mixture in a chemical reducing (non-oxidizing) environment, for forming a heated product including solid calcium bromide. — 126d 120 — Processing the heated product including solid calcium bromide, so as to form bromine. — 126e 124 — Controlling operation of, and processing data-information associated with, method steps (procedures / processes) and related equipment.

*{Recovering bromine from solid waste containing bromine compounds.}*

130
> Dissolving the heated product (of solid calcium bromide) in water, thereby forming an aqueous solution of calcium bromide.

134
> Subjecting the calcium bromide aqueous solution to a separation procedure, thereby separating bromine from the aqueous solution.

---

138
> Heating the heated product (of solid calcium bromide) in presence of oxygen, thereby forming solid calcium oxide and gaseous bromine.

142
> Condensing the gaseous bromine, thereby forming liquid bromine.

300      FIG. 3

*{Manufacturing calcium bromide from solid waste containing bromine compounds.}*

304

Providing the solid waste containing the bromine compounds.

322a

308

Providing a supply of solid calcium hydroxide.

322b

312

Mixing the solid waste and the solid calcium hydroxide, thereby forming a mixture thereof.

322c

316

Heating the mixture in a chemical reducing (non-oxidizing) environment, so as to form solid calcium bromide.

322d

320

Controlling operation of, and processing data-information associated with, method steps (procedures / processes) and related equipment.

322

RECOVERING BROMINE FROM SOLID WASTE CONTAINING BROMINE COMPOUNDS, AND APPLICATIONS THEREOF

RELATED APPLICATION

This application claims the benefit of priority under 35 USC 119(e) of U.S. Provisional Patent Application No. 62/117,492, filed Feb. 18, 2015, entitled "Recovering Bromine From Solid Waste Containing Bromine Compounds, And Applications Thereof", the contents of which are incorporated herein by reference in their entirety.

FIELD OF THE INVENTION

The present invention, in some embodiments thereof, relates to recovering bromine from solid waste containing bromine compounds, and applications thereof, such as for recovering bromine in a form suitable for reuse, or for manufacturing bromine salt (for example, calcium bromide).

BACKGROUND OF THE INVENTION

Flame (or fire) retardant materials (additives, ingredients, substances), also referred to as flame (or fire) retardants, are used in manufacturing countless different types and kinds of products encompassed by, or relating to, numerous fields. Such products are commercially used and applied in a wide variety of industries, such as construction (building materials), floors and floor coverings, roofs and roof coverings, furniture, upholstery, carpeting (rugs), clothing (textiles), electrical and electronics equipment, packaging, agriculture, transportation, aerospace, and military. Flame (fire) retardant materials are used for the objective of providing flame (fire) retardant properties to, or improving flame (fire) retardant properties of, such commercially used products.

The most widely used category of flame (fire) retardant materials consists of bromine-based flame (fire) retardant materials, which are made of or from, and include, (organic or/and inorganic) types of bromine compounds or brominated types of (organic or/and inorganic) compounds that have an inhibitory effect on combustion (ignition, burning) of combustible (ignitable, flammable) materials. Such organic types of bromine compounds or brominated types of organic compounds (i.e., organobromide compounds) are commonly known and referred to as brominated flame retardant (BFR) compounds, or as brominated flame retardants (BFRs).

In processes of, or involving, manufacturing bromine-based flame retardant materials, a large amount of waste in solid form is generated, which, after special handling/processing (to neutralize or/and stabilize potentially hazardous bromine compounds), needs to be disposed of, typically, in a landfill. Such processes are accompanied by costs relating to special handling/processing of the solid waste, costs relating to landfill disposal of the solid waste, and costs relating to unused (non-consumed) bromine leftover in the solid waste. For example, in such processes, each ton (2000 pounds) of (input) raw material (organic or/and inorganic) bromine compounds generates about one-half ton (1000 pounds) of solid waste, of which about 30% is of unused (non-consumed) bromine that is disposed of.

In such processes, the solid waste may contain substantial amounts of unused (non-consumed) bromine. If such unused bromine can be recovered, recycled (reused), or/and used for other applications (e.g., other manufacturing processes requiring bromine then overall costs associated with manufacturing bromine-based flame retardant materials can be significantly reduced and profit increased.

SUMMARY OF THE INVENTION

The present invention, in some embodiments thereof, relates to recovering bromine from solid waste containing bromine compounds, and applications thereof, such as for recovering bromine in a form suitable for reuse, or for manufacturing bromine salt (for example, calcium bromide).

According to an aspect of some embodiments of the present invention, there is provided a method for recovering bromine from solid waste containing bromine compounds, the method comprising: providing the solid waste containing the bromine compounds; providing a supply of solid calcium hydroxide; mixing the solid waste and the solid calcium hydroxide, thereby forming a mixture thereof, heating the mixture in a chemical reducing (non-oxidizing) environment, for forming a heated product including solid calcium bromide; and processing the heated product including solid calcium bromide, so as to form bromine.

According to an aspect of some embodiments of the present invention, there is provided a method for manufacturing solid calcium bromide from solid waste containing bromine compounds, the method comprising: providing the solid waste containing the bromine compounds; providing a supply of solid calcium hydroxide; mixing the solid waste and the solid calcium hydroxide, thereby forming a mixture thereof; and heating the mixture in a chemical reducing (non-oxidizing) environment, so as to form solid calcium bromide.

According to some embodiments of the invention, there is supplying an amount of the solid calcium hydroxide corresponding to stoichiometric equivalent of amount of bromine contained in bromine compounds of the provided solid waste.

According to some embodiments of the invention, the mixing is performed in a manner so that the mixture formed therefrom is in a powdered form.

According to some embodiments of the invention, the heating is performed with an operating temperature in a range of between about 400° C. and about 800° C.

According to some embodiments of the invention, the heating is performed with an operating pressure in a range of between about 0.1 atmosphere (atm) [76.0 mm Hg], and about 2 atmospheres (atm) [1520 mm Hg].

According to some embodiments of the invention, the heating includes removing gases formed therefrom.

According to some embodiments of the invention, the heating includes forcibly transferring and moving the heated mixture, and the heated product of calcium bromide formed therefrom, from start to finish of the heating.

According to some embodiments of the invention, the forcibly transferring and moving is performed using a forced mass transfer device.

According to some embodiments of the invention, the forced mass transfer device includes one or more controllably rotatable components configured and operative to controllably rotate with an operating speed or rate of rotation in a range of between about 1 round per minute (rpm) and about 30 rounds per minute (rpm).

According to some embodiments of the invention, the heating is performed with a chemical reaction residence time in a range of between about 20 minutes (min) and about 60 minutes min).

According to some embodiments of the invention, processing of the heated product including calcium bromide includes dissolving the heated product of solid calcium bromide in water, thereby forming an aqueous solution of calcium bromide.

According to some embodiments of the invention, there is subjecting the calcium bromide aqueous solution to a separation procedure, thereby separating bromine from the aqueous solution.

According to some embodiments of the invention, processing the heated product including calcium bromide includes heating the heated product of solid calcium bromide in presence of oxygen, thereby forming solid calcium oxide and gaseous bromine.

According to some embodiments of the invention, there is condensing the gaseous bromine, thereby forming liquid bromine.

According to some embodiments of the invention, the method further comprises controlling operation of, and processing data-information associated with, providing the solid waste, providing the supply of solid calcium hydroxide, the mixing, and the heating, via a process control/data-information processing unit.

According to some embodiments of the invention, the method further comprises controlling operation of, and processing data-information associated with, processing the solid calcium bromide.

According to an aspect of some embodiments of the present invention, there is provided a system for recovering bromine from solid waste containing bromine compounds, the system comprising: a solid waste input unit, for receiving and containing the solid waste; a solid calcium hydroxide supply unit, for supplying solid calcium hydroxide to the solid waste; a mixing unit, operatively connected to the solid waste input unit and the solid calcium hydroxide supply unit, for mixing the solid waste and the solid calcium hydroxide, and wherein is formed a mixture thereof, a heating unit, operatively connected to the mixing unit, for heating the mixture in a chemical reducing (non-oxidizing) environment, and wherein is formed a heated product comprising solid calcium bromide; and a chemical processing unit, operatively connected to the heating unit, for processing the solid calcium bromide, and wherein is formed bromine.

According to an aspect of some embodiments of the present invention, there is provided a system for manufacturing solid calcium bromine from solid waste containing bromine compounds, the system comprising: a solid waste input unit, for receiving and containing the solid waste; a solid calcium hydroxide supply unit, for supplying solid calcium hydroxide to the solid waste; a mixing unit, operatively connected to the solid waste input unit and the solid calcium hydroxide supply unit, for mixing the solid waste and the solid calcium hydroxide, and wherein is formed a mixture thereof; and a heating unit, for heating the mixture in a chemical reducing (non-oxidizing) environment, and wherein is formed solid calcium bromide.

According to some embodiments of the invention, the solid calcium hydroxide supply unit is configured to supply an amount of the solid calcium hydroxide corresponding to stoichiometric equivalent of amount of bromine contained in bromine compounds of the provided solid waste.

According to some embodiments of the invention, the mixing unit includes a mixing device configured to mix the solid waste and the solid calcium hydroxide, whereby the mixture formed therefrom is in a powdered form.

According to some embodiments of the invention, the heating unit is configured to heat the mixture at an operating temperature in a range of between about 400° C. and about 800° C.

According to some embodiments of the invention, the heating unit is configured to heat the mixture at an operating pressure in a range of between about 0.1 atmosphere (atm) [76.0 mm Hg], and about 2 atmospheres (atm) [ 1520 mm Hg].

According to some embodiments of the invention, the heating unit is configured to remove gases formed during the heating of the mixture.

According to some embodiments of the invention, the heating unit includes a heating device configured to forcibly transfer and move the mixture, and the heated product of calcium bromide formed therefrom, through the heating device during the heating.

According to some embodiments of the invention, the heating device includes a forced mass transfer device configured to effect the forcible transfer and movement through the heating device.

According to some embodiments of the invention, the heating device includes a heating chamber, wherein is located the forced mass transfer device.

According to some embodiments of the invention, the forced mass transfer device includes a controllably rotatable component configured and operative to controllably rotate as a controllably rotatable screw or similarly geometrically configured and operative type of rotatable component.

According to some embodiments of the invention, the controllably rotatable component is configured and operative to controllably rotate with an operating speed or rate of rotation in a range of between about 1 round per minute (rpm) and about 30 rounds per minute (rpm).

According to some embodiments of the invention, the heating unit is configured to heat the mixture for a chemical reaction residence time in a range of between about 20 minutes (min) and about 60 minutes (min).

According to some embodiments of the invention, the system further comprises a process control/data-information processing unit, operatively connected to, and, controlling operation of and processing data-information associated with, the solid waste input unit, the solid calcium hydroxide supply unit, the mixing unit, and the heating unit.

According to some embodiments of the invention, the process control/data-information processing unit is further operatively connected to, and, controlling operation of and processing data-information associated with, the chemical processing unit.

All technical or/and scientific words, terms, or/and phrases, used herein have the same or similar meaning as commonly understood by one of ordinary skill in the art to which the invention pertains, unless otherwise specifically defined or stated herein. Methods, materials, and examples described herein are illustrative only and are not intended to be necessarily limiting. Although methods or/and materials equivalent or similar to those described herein can be used in practicing or/and testing embodiments of the invention, exemplary methods or/and materials are described below. In case of conflict, the patent specification, including definitions, will control.

Implementation of some embodiments of the invention can involve performing or completing selected tasks manually, automatically, or a combination thereof. Moreover, according to actual instrumentation and equipment of some embodiments of the invention, several selected tasks could be implemented by hardware, by software, by firmware, or a combination thereof, using an operating system.

For example, hardware for performing selected tasks according to embodiments of the invention could be implemented as a chip, as a circuit, or a combination thereof. As software, selected tasks of some embodiments of the invention could be implemented as a plurality of software instructions being executed by a computer using any suitable operating system. In an exemplary embodiment of the invention, one or more tasks of exemplary embodiments of the method and/or system as described herein are performed by a data processor, such as a computing platform for executing a plurality of instructions. Optionally, the data processor includes a volatile memory for storing instructions or/and data. Alternatively or additionally, optionally, the data processor includes a non-volatile storage, for example, a magnetic hard-disk or/and removable media, for storing instructions or/and data. Optionally, a network connection is provided as well. Optionally, a display or/and a user input device such as a keyboard or mouse is provided as well.

BRIEF DESCRIPTION OF THE DRAWINGS

Some embodiments of the present invention are herein described, by way of example only, with reference to the accompanying drawings. With specific reference now to the drawings in detail, it is stressed that the particulars shown are by way of example and for purposes of illustrative description of some embodiments of the present invention. In this regard, the description taken together with the accompanying drawings make apparent to those skilled in the art how some embodiments of the present invention may be practiced.

In the drawings:

FIG. 1A is a flow diagram of an exemplary embodiment of a method for recovering bromine from solid waste containing bromine compounds, in accordance with some embodiments of the invention;

FIG. 1B is a flow diagram of exemplary steps (procedures/processes) of processing the solid calcium bromide [salt] formed via the exemplary embodiment of the method for recovering bromine from solid waste containing bromine compounds presented in FIG. 1A, in accordance with some embodiments of the invention;

FIG. 3 is a flow diagram of an exemplary embodiment of a method for manufacturing solid calcium bromide [salt] from solid waste containing bromine compounds, in accordance with some embodiments of the invention.

DESCRIPTION OF SPECIFIC EMBODIMENTS OF THE INVENTION

Figure 2:
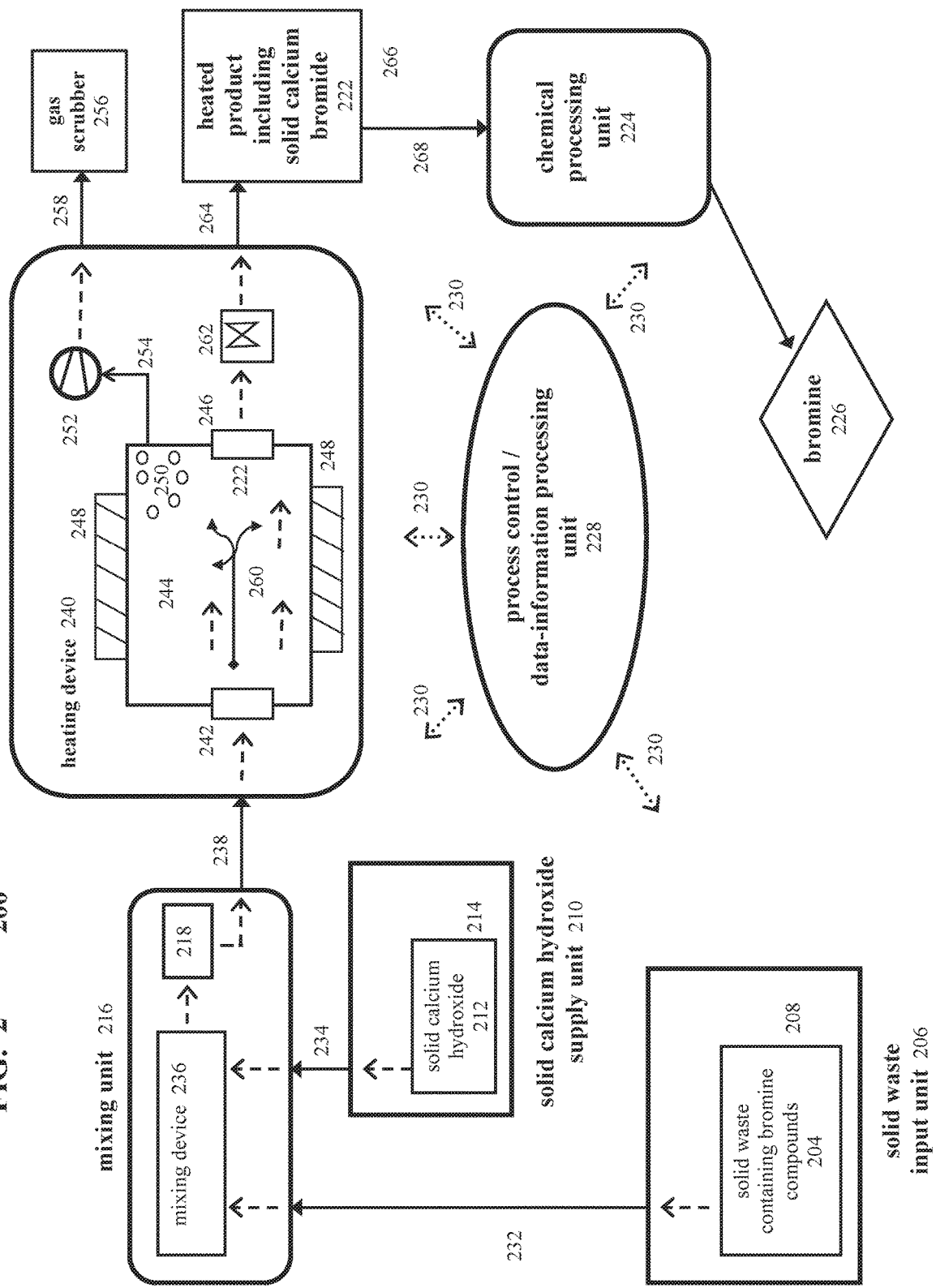
FIG. 2 is a schematic (process flow type) diagram of an exemplary embodiment of a system for recovering bromine (also applicable to manufacturing solid calcium bromide [salt]) from solid waste containing bromine compounds, in accordance with some embodiments of the invention.

The present invention, in some embodiments thereof, relates to recovering bromine from solid waste containing bromine compounds, and applications thereof, such as for recovering bromine in a form suitable for reuse, or for manufacturing bromine salt (for example, calcium bromide).

In processes of, or involving, manufacturing bromine-based flame retardant materials, a large amount of waste in solid form is generated, which, after special handling/processing (to neutralize or/and stabilize potentially hazardous bromine compounds), needs to be disposed of typically, in a landfill. Such processes are accompanied by costs relating to special handling/processing of the solid waste, costs relating to landfill disposal of the solid waste, and costs relating to, typically, substantial amounts of, unused (non-consumed) bromine leftover in the solid waste.

Some embodiments of the invention provide unique ways (for example, involving mixing, heating, chemical processing, and, controlling processes and equipment) for such unused (non-consumed) bromine leftover in the solid waste to be recovered, recycled (reused), or/and used for other applications (e.g., other manufacturing processes requiring bromine). Some embodiments of the invention are applicable for significantly reducing overall costs, and increasing profits, associated with manufacturing bromine-based flame retardant materials. Some embodiments of the invention are suitable in applications involving manufacturing bromine-based flame retardant materials without requiring special handling/processing involved in neutralizing, stabilizing, or/and disposing of potentially hazardous bromine compounds. Some embodiments of the bromine recovery process, and of the solid calcium bromide manufacturing process, are highly efficient in terms of producing relatively small amounts of waste or/and side products. Some embodiments of the invention provide highly efficient and cost effective ways of recovering bromine, as well as of manufacturing high quality solid calcium bromide salt.

Steps or procedures, sub-steps or sub-procedures, and, equipment and materials, system units, system sub-units, devices, assemblies, sub-assemblies, mechanisms, structures, components, elements, and configurations, and, peripheral equipment, utilities, accessories, and materials, as well as operation and implementation, of exemplary embodiments, alternative embodiments, specific configurations, and, additional and optional aspects, characteristics, or features, thereof, of some embodiments of the present invention, are better understood with reference to the following illustrative description and accompanying drawings. Throughout the following illustrative description and accompanying drawings, same reference notation and terminology (i.e., numbers, letters, symbols) are consistently used and refer to same steps or procedures, structures, components, elements, or/and features. It is to be understood that the invention is not necessarily limited in its application to any particular sequential ordering of method steps or procedures, or to particular details of construction or/and arrangement of device, apparatus, or/and system components, set forth in the following illustrative description. The invention is capable of other embodiments or of being practiced or carried out in various ways.

An aspect of some embodiments of the present invention is a method for recovering bromine from solid waste containing bromine compounds.

Referring now to the drawings, FIG. 1A is a flow diagram of an exemplary embodiment (indicated as, and referred to by, reference number 100), including the indicated exemplary steps (procedures/processes) thereof, of a method for recovering bromine from solid waste containing bromine compounds. In FIG. 1A, the exemplary embodiment 100 of the method includes exemplary steps (procedures/processes) represented by separate blocks (frames) which are assigned reference numbers, for example, 104, 108, 112, etc. Herein, the exemplary embodiment 100 of a method for recovering bromine from solid waste containing bromine compounds is also referred to as the bromine recovery method.

As shown in FIG. 1, in a non-limiting manner, and in some embodiments, such as exemplary embodiment 100, the bromine recovery method includes the following exemplary steps (procedures/processes).

In 104, there is providing the solid waste containing the bromine compounds.

In 108, there is providing a supply of solid calcium hydroxide [Ca(OH)$_2$ (solid)], commonly known and referred to as lime.

In 112, there is mixing the solid waste and the solid calcium hydroxide, thereby forming a mixture thereof.

In 116, there is heating the mixture in a chemical reducing (non-oxidizing) environment (i.e., an environment absent of chemical oxidation conditions, and with presence of chemical reduction conditions), thereby forming a heated product including solid calcium bromide [CaBr$_2$ (salt)].

In 120, there is processing the heated product including solid calcium bromide [CaBr$_2$ (salt)], so as to form bromine [Br$_2$].

In exemplary embodiments of the invention, performance of exemplary steps (procedures/processes) 104, 108, 112, 116, and 120, results in recovering bromine from the solid waste containing the bromine compounds.

In exemplary embodiments, the bromine recovery method additionally includes exemplary step (procedure/process) 124, wherein there is controlling operation of, and processing data-information associated with, method steps (procedures/processes) 104, 108, 112, 116, and 120, and related equipment used for performing thereof. More specifically, in 124, there is controlling operation of, and processing data-information associated with, method steps (procedures/processes), and related equipment used for performing: 104—providing the solid waste containing the bromine compounds; 108—providing a supply of solid calcium hydroxide; 112—mixing the solid waste and the solid calcium hydroxide, thereby forming a mixture thereof; 116—heating the mixture in a chemical reducing (non-oxidizing) environment, thereby forming a heated product including solid calcium bromide; and 120—processing the heated product including solid calcium bromide, so as to form bromine. In FIG. 1A, such controlling and processing of the bromine recovery method steps (procedures/processes), and related equipment used for performing thereof, are schematically represented by dashed line 126 extending from 124 and connecting to dashed lines 126a, 126b, 126c, 126d, and 126e, extending from the respective method steps (procedures/processes) 104, 108, 112, 116, and 120.

FIG. 1B is a flow diagram of exemplary steps (procedures/processes) of bromine recovery method step (procedure/process) 120 of processing the heated product including the solid calcium bromide (salt), for example, as formed via the exemplary embodiment 100 of the method for recovering bromine from solid waste containing bromine compounds presented in FIG. 1A.

In exemplary embodiments of the bromine recovery method, the step (procedure/process) 120 of processing the (cooled or hot) heated product including solid calcium bromide may include exemplary steps (procedures/processes) 130 and 134, for example, as presented in FIG. M. In 130, there is dissolving the heated product (of solid calcium bromide [ CaBr$_2$ (salt)]) in water, thereby forming an aqueous solution of calcium bromide. In 134, there is subjecting the calcium bromide aqueous solution to a separation procedure, thereby separating bromine from the aqueous solution.

In exemplary embodiments, the step (procedure/process) 120 of processing the (cooled or hot) heated product (of solid calcium bromide [CaBr$_2$ (salt)]), instead of (i.e., alternatively to), or, in addition to (i.e., separately, in parallel or concurrently), including steps (procedures/processes) 130 and 134, may include exemplary steps (procedures/processes) 138 and 142, for example, as presented in FIG. 1B. In 138, there is heating the (cooled or hot) heated product (of solid calcium bromide [CaBr$_2$ (salt)]) in presence of oxygen, thereby forming solid calcium oxide [CaO] and gaseous bromine [Br$_2$]. In 142, there is condensing the gaseous bromine, thereby forming liquid bromine.

In exemplary embodiments, as part of controlling operation of, and processing data-information associated with, the step (procedure/process) 120 of processing the heated product including solid calcium bromide, there is controlling operation of, and processing data-information associated with, exemplary steps (procedures/processes) 130 and 134 or/and exemplary steps (procedures/processes) 138 and 142.

Another aspect of some embodiments of the present invention is a system for recovering bromine from solid waste containing bromine compounds.

The system for recovering bromine from solid waste containing bromine compounds, in a non-limiting manner, and in some embodiments, includes: a solid waste input unit, a solid calcium hydroxide supply unit, a mixing unit, a heating unit, and a chemical processing unit. In some embodiments, the bromine recovery system additionally includes a process control/data-information processing unit.

FIG. 2 is a schematic (process flow type) diagram of an exemplary embodiment (indicated as, and referred to by, reference number 200), including the indicated exemplary units, devices, assemblies, components, functionalities, and features thereof, of a system for recovering bromine from solid waste containing bromine compounds.

The exemplary embodiment 200 of the system shown in FIG. 2, in a non-limiting manner, is suitable for implementing some embodiments of the method for recovering bromine from solid waste containing bromine compounds, such as exemplary embodiment 100 of the bromine recovery method presented in FIGS. 1A and 1B. Similarly, the exemplary embodiment 100 of the method presented in FIGS. 1A and 1B, in a non-limiting manner, is suitable for implementing some embodiments of the system for recovering bromine from solid waste containing bromine compounds, such as exemplary embodiment 200 of a bromine recovery system presented in FIG. 2. Herein, the exemplary embodiment 200 of a system for recovering bromine from solid waste containing bromine compounds is also referred to as the bromine recovery system.

As shown in FIG. 2, in a non-limiting manner, and in some embodiments, such as exemplary embodiment 200, the bromine recovery system includes the following exemplary (chemical process/chemical processing) units: a solid waste input unit, a solid calcium hydroxide supply unit, a mixing unit, a heating unit, and a chemical processing unit. In some embodiments, the bromine recovery system additionally includes a process control/data-information processing unit.

Solid waste input unit 206 is for receiving and containing the solid waste 204. Solid waste 204 is fed or input to the bromine recovery system via solid waste input unit 206, and held or contained in a holding or containing vessel (container), for example, holding or containing vessel (container) 208.

Solid calcium hydroxide supply unit 210 is for supplying solid calcium hydroxide [Ca(OH)$_2$], for example, solid calcium hydroxide 212, to the solid waste 204. Solid calcium hydroxide supply unit 210 includes a holding or containing vessel (container), for example, holding or containing vessel (container) 214, for holding or containing the solid calcium hydroxide 212, and from which the solid calcium hydroxide 212 is supplied to the solid waste 204.

Mixing unit 216, operatively connected to the solid waste input unit 206 and the solid calcium hydroxide supply unit 210, is for mixing the solid waste 204 and the solid calcium hydroxide 212, and wherein is formed a mixture 218 of the solid waste 204 and the solid calcium hydroxide 212.

Heating unit 220, operatively connected to the mixing unit 216, is for heating the mixture of the solid waste 204 and the solid calcium hydroxide 212, in a chemical reducing (non-oxidizing) environment (i.e., absence of chemical oxidation conditions, and presence of chemical reduction conditions), and wherein is formed a heated product 222 including solid calcium bromide [$CaBr_2$ (salt)].

Chemical processing unit 224, operatively connected to the heating unit 220, is for processing the heated product 222 including solid calcium bromide [$CaBr_2$ (salt)], and wherein is formed bromine [$Br_2$] 226.

In exemplary embodiments of the invention, processing the solid waste 204 via the solid waste input unit 206, the solid calcium hydroxide supply unit 210, the mixing unit 216, the heating unit 220, and the chemical processing unit 224, results in recovering bromine 226 from the solid waste 204 containing the bromine compounds.

As illustratively described hereinabove, and shown in FIG. 1A, in exemplary embodiments of the invention, such as exemplary embodiment 100, the bromine recovery method additionally includes exemplary step (procedure/process) 124, wherein there is controlling operation of, and processing data-information associated with, method steps (procedures/processes), and related equipment used for performing: 104—providing the solid waste containing the bromine compounds; 108—supplying solid calcium hydroxide; 112—mixing the solid waste and the solid calcium hydroxide, thereby forming a mixture thereof, 116—heating the mixture in a chemical reducing (non-oxidizing) environment (i.e., an environment absent of chemical oxidation conditions, and with presence of chemical reduction conditions), thereby forming a heated product including solid calcium bromide; and 120—processing the heated product including solid calcium bromide, so as to form and obtain the bromine.

Accordingly, as shown in FIG. 2, in exemplary embodiments of the invention, such as exemplary embodiment 200, the bromine recovery system additionally includes a process control/data-information processing unit 228, operatively connected to, and, controlling operation of and processing data-information associated with, the other bromine recovery system process units (and components therein), namely, the solid waste input unit 206, the solid calcium hydroxide supply unit 210, the mixing unit 216, the heating unit 220, and the chemical processing unit 224. In a complimentary manner, in exemplary embodiments, each of the bromine recovery system process units (and components therein), namely, solid waste input unit 206, solid calcium hydroxide supply unit 210, mixing unit 216, heating unit 220, and chemical processing unit 224, is operatively connected to, and controlled by, process control/data-information processing unit 228. Operative connections and configurations between the process control/data-information processing unit 226 and each of the other bromine recovery system process units (and components therein) are schematically represented by the double headed dotted line arrows 230 surrounding process control/data-information processing unit 228.

Following are additional illustrative description and details of some embodiments of the method, and some embodiments of the system, for recovering bromine from solid waste containing bromine compounds. As appropriate, reference is made to the exemplary drawings (figures) of some embodiments of the invention. For example, in a non-limiting manner, and in some embodiments, such as exemplary embodiment 100 (FIGS. 1A, 1B) of the bromine recovery method and the following illustratively described exemplary steps (procedures/processes), sub-steps (sub-procedures/sub-processes) thereof, and features thereof. Additionally, for example, in a non-limiting manner, and in some embodiments, such as exemplary embodiment 200 (FIG. 2) of the bromine recovery system and the following illustratively described exemplary components (units, devices, assemblies, mechanisms, equipment, structures), functionalities thereof, and features thereof.

Providing the Solid Waste Containing the Bromine Compounds//Solid Waste Input Unit The solid waste containing bromine compounds, for example, solid waste 204, is provided by/supplied from, for example, a commercial producer or manufacturer of flame (fire) retardant materials consisting of bromine-based flame (fire) retardant materials. The bromine-based flame (fire) retardant materials are made of or from, and include, (organic or/and inorganic) types of bromine compounds or brominated types of (organic or/and inorganic) compounds. Such organic types of bromine compounds or brominated types of organic compounds (i.e., organobromide compounds) are commonly known and referred to as brominated flame retardant (BFR) compounds, or as brominated flame retardants (BFRs).

In general, the solid waste 204 may include any number and type or kind of organic or/and inorganic bromine compounds.

Solid waste input unit 206 includes holding or containing vessel (container) 208, for receiving and holding or containing the solid waste 204, and from which the solid waste 204 is fed or input (for example, via chemical [solids] transport line 232) to the mixing unit 216.

Providing a Supply of Solid Calcium Hydroxide//Solid Calcium Hydroxide Supply Unit Solid calcium hydroxide supply unit 210 includes holding or containing vessel (container) 214, for holding or containing the solid calcium hydroxide [$Ca(OH)_2$ (solid)] 212, and from which the solid calcium hydroxide 212 is supplied (for example, via chemical [solids] transport line 234) to the mixing unit 216.

In exemplary embodiments, there is supplying an amount or quantity of the solid calcium hydroxide 212 that corresponds to the stoichiometric equivalent of the amount or quantity of bromine contained in the bromine compounds of the solid waste 204. In exemplary embodiments, the stoichiometric equivalent is in terms of stoichiometric molar equivalent of the (molar) amount or quantity of bromine contained in the bromine compounds of the solid waste 204. Thus, in exemplary embodiments, there is supplying the stoichiometric (molar) amount or quantity of the solid calcium hydroxide 212 that corresponds to the stoichiometric equivalent of the (molar) amount or quantity of bromine contained in the bromine compounds of the solid waste 204.

In exemplary embodiments, an amount or quantity of the solid calcium hydroxide 212 is supplied to the solid waste 204 such that chemical reaction (occurring inside the heating unit 220) between the two reactants, solid calcium hydroxide 212 and solid waste 204, goes to full, or nearly full, completion, for forming the solid calcium bromide [$CaBr_2$ (salt)] 222, whereby, the entire initial amount or quantity of each reactant is fully, or near fully, consumed, while leaving no, or minimal, excess of either reactant, as well as forming minimal amounts or quantities of side products.

Mixing the Solid Waste and the Solid Calcium Hydroxide//Mixing Unit

In exemplary embodiments, initially, the solid waste 204 is fed or input (for example, via chemical [solids] transport line 232) to the mixing unit 216, and then, the solid calcium hydroxide 212 is supplied (for example, via chemical [solids] transport line 234) to the mixing unit 216 (already containing the solid waste 204). Alternatively, in exemplary embodiments, initially, the solid calcium hydroxide 212 is supplied (for example, via chemical [solids] transport line 234) to the mixing unit 216, and then, the solid waste 204 is fed or input (for example, via chemical [solids] transport line 232) to the mixing unit 216 (already containing the solid calcium hydroxide 212).

Mixing unit 216 includes a mixing device, for example, mixing device 236, for receiving, and then mixing, the solid waste 204 and the solid calcium hydroxide 212, and wherein is formed the mixture 218 of the solid waste 204 and the solid calcium hydroxide 212.

In exemplary embodiments, mixing device 236 is configured and operative to mix solids, such as solid waste 204 and solid calcium hydroxide 212. In exemplary embodiments, mixing device 236 is configured and operative to mix powders, for example, wherein solid waste 204 or/and solid calcium hydroxide 212 are solids in powder form (i.e., powdered solids), whereby the mixture 218 formed therefrom is in a powdered form. In exemplary embodiments, mixing device 236 is configured and operative to mix non-powdered forms of the solid waste 204 or/and the solid calcium hydroxide 212, whereby the mixture 218 formed therefrom is in a powdered form.

In exemplary embodiments, mixing device 236 includes one or more mixing assemblies, mixing mechanisms, or/and mixing elements, such as mixing agitators or/and mixing impellers, configured and operative to insure uniform, thorough, and complete mixing of solid waste 204 and solid calcium hydroxide 212 inside mixing device 236, for forming a uniform mixture 218 of the solid waste 204 and the solid calcium hydroxide 212, prior to the mixture 218 being fed (for example, via chemical [solids] transport line 238) to the heating unit 220.

Heating the Mixture of Solid Waste and Solid Calcium Hydroxide//Heating Unit

The mixture 218 of the solid waste 204 and the solid calcium hydroxide 212 is heated, in a chemical reducing (non-oxidizing) environment (i.e., absence of chemical oxidation conditions, and presence of chemical reduction conditions), thereby forming a heated product including solid calcium bromide [$CaBr_2$ (salt)].

Heating unit 220, operatively connected to the mixing unit 216, is configured and operative to heat the mixture of the solid waste 204 and the solid calcium hydroxide 212, in absence of oxygen (i.e., absence of chemical oxidation conditions, and presence of chemical reduction conditions). In the heating unit 220, chemical reactions take place in the mixture 218 between the solid waste 204 and the solid calcium hydroxide 212, to thereby form the solid calcium bromide [$CaBr_2$ (salt)] 222.

Heating unit 220 includes a heating device, for example, heating device 240, which includes, for example, an input assembly, a heating chamber, and an output assembly. In exemplary embodiments, the heating device 240 includes, or/and is operatively connected to, and is supplied heat by, one or more heating assemblies, heating mechanisms, or/and heating elements, herein, generally referred to as one or more heaters. In exemplary embodiments, the heating device 240 is configured and operative as a type of oven or as a type of furnace.

In exemplary embodiments, heating device 240 includes heating device input assembly 242, heating chamber 244, and heating device output assembly 246.

Heating device input assembly 242 is configured and operative to receive (from mixing unit 216 [for example, via chemical [solids] transport line 238]), and provide passage of, the mixture 218 of the solid waste 204 and the solid calcium hydroxide 212 into the heating chamber 244.

Heating chamber 244 is configured and operative to receive (from mixing unit 216), to hold or contain, and to heat, the mixture 218 of the solid waste 204 and the solid calcium hydroxide 212, which chemically reacts and forms the heated product 222 (including the solid calcium bromide [$CaBr_2$ (salt)], as well as other possible solid reaction products).

In exemplary embodiments, the heating device 240 is configured and operative such that the heating chamber 244 includes, or/and is operatively connected to, and is supplied heat by, one or more heaters (heating assemblies, heating mechanisms, or/and heating elements). For example, in FIG. 2, the one or more heaters are schematically represented by the pair of heaters referenced by 248. As shown therein, in a non-limiting manner, heaters 248 are configured on the outside of the heating chamber 244. In exemplary embodiments, heaters 248 may, additionally, or, alternatively, be configured on the inside of the heating chamber 244. In exemplary embodiments, the one or more heaters (heating assemblies, heating mechanisms, or/and heating elements) are powered by electricity, for example, as resistive type electrical heaters.

Heating device output assembly 246 is configured and operative to provide passage of the formed heated product 222 (including the solid calcium bromide [$CaBr_2$ (salt)], as well as other possible solid reaction products) out of the heating chamber 244. For effecting such passage and exiting of the heated product 222 out from the heating chamber 244 of the heating device 240, in exemplary embodiments, the heating device output assembly 246 includes, or is operatively connected to, an exit flange. Alternatively, or additionally, in exemplary embodiments, the heating device output assembly 246 includes, or is operatively connected to, an exit valve assembly or mechanism, for example, exit valve assembly or mechanism 262.

Chemical Reaction Heating, Temperature, Pressure Conditions//Parameters, Characteristics In exemplary embodiments, the heating unit 220, in general, and the heating device 240 (including the heating chamber 244) in particular, are configured and operative to heat the mixture 218 of the solid calcium hydroxide 212 and the solid waste 204, in a chemical reducing (non-oxidizing) environment (absence of chemical oxidation conditions, and presence of chemical reduction conditions), for effecting formation of the heated product including the solid calcium bromide [$CaBr_2$ (salt)] 222.

In exemplary embodiments, the heating unit 220, in general, and the heating device 240 (including the heating chamber 244), in particular, are configured and operative to heat the mixture 218 of the solid calcium hydroxide 212 and the solid waste 204 at a relatively high temperature, for example, wherein the operating temperature (during the heating process) is in a range of between about 400° C. and about 800° C. In exemplary embodiments, the heating unit 220, in general, and the heating device 240, in particular, are configured and operative to heat the mixture 218 of the solid calcium hydroxide 212 and the solid waste 204 at a temperature of about 500° C. For effecting such heating environment at relatively high temperature, in exemplary embodiments, the heaters 248 (heating assemblies, heating mechanisms, or/and heating elements) are configured and operative to supply/provide heat to the heating chamber 244, during the heating process, so as to obtain therein an operating temperature in a range of between about 400° C. and about 800° C., for example, at a temperature of about 500° C.

In exemplary embodiments, the heating unit 220, in general, and the heating device 240 (including the heating chamber 244), in particular, are configured and operative to provide and maintain a chemical reducing environment (i.e., absent of chemical oxidation conditions, and presence of chemical reduction conditions), during the heating process, for effecting formation of the heated product including the solid calcium bromide [CaBr$_2$ (salt)] 222. During the heating process, oxygen gas, or/and other possible oxidizing type gases, may be formed, which, undesirably, could provide chemical oxidation conditions inside the heating chamber 244. Additionally, during the heating process, hazardous gaseous hydrogen bromide [HBr (gas)] may also be formed. In FIG. 2, gases formed during the heating process are generally referenced by the small circles 250.

For providing and maintaining a chemical reducing environment (i.e., absent of chemical oxidation conditions, and presence of chemical reduction conditions), as well as for removing (venting) gaseous hydrogen bromide [HBr (gas)], which may be formed during the heating process, in exemplary embodiments, the heating unit 220, in general, and the heating device 240 (including the heating chamber 244), in particular, are configured and operative to remove (vent) gases formed during the heating process. For effecting such removing (venting) of oxidizing gas or gases 250, in exemplary embodiments, the heating unit 220, in general, and the heating device 240 (including the heating chamber 244), in particular, include, or/and are operatively connected to, one or more gas removing (venting) assemblies, or/and gas removing (venting) mechanisms, herein, generally referred to as one or more gas removing (venting) devices.

For example, as shown in FIG. 2, the heating unit 220 includes a gas removing (venting) device, for example, gas removing (venting) device 252, such as a vacuum pump, operatively connected (for example, via chemical [gas] transport line 254) to the heating chamber 244 of the heating device 240, and configured to remove (vent, pump out) gases 250 formed inside the heating chamber 244 of the heating device 240 during the heating process.

In some embodiments of the invention, gases 250 (including, for example, hazardous hydrogen bromide [Hr (gas)]) formed inside the heating chamber 244 of the heating device 240 during the heating process, and removed (vented, pumped out), for example, by gas removing (venting) device 252, are then subjected to a gas cleaning (scrubbing) process, for example, including operation of one or more gas cleaning (scrubbing) assemblies, or/and gas cleaning (scrubbing) mechanisms, herein, generally referred to as one or more gas cleaning (scrubbing) devices. In such exemplary embodiments, such as exemplary embodiment 200, the bromine recovery system is configured and operative to clean (scrub) gases 250 formed inside the heating chamber 244 of the heating device 240 during the heating process. In such exemplary embodiments, for example, the heating unit 220 includes, or/and is operatively connected to, a gas cleaning (scrubbing) device, for example, gas scrubber 256. In exemplary embodiments, gases 250 formed inside the heating chamber 244 of the heating device 240 during the heating process, and removed (vented, pumped out), for example, by gas removing (venting) device 252, are then directed, for example, via chemical [gas] transport line 258, into the gas scrubber 256.

In exemplary embodiments, the heating unit 220, in general, and the heating device 240 (including the heating chamber 244), in particular, are configured and operative to heat the mixture 218 of the solid calcium hydroxide 212 and the solid waste 204 under an operating pressure being in a relatively wide range, for example, spanning from below atmospheric pressure, for example, about 0.1 atmosphere (atm) [76.0 mm Hg], to above atmospheric pressure, for example, about 2 atmospheres (atm) [1520 mm Hg]. For effecting such heating environment within the indicated pressure range, in exemplary embodiments, the gas removing (venting) device 252 (such as a vacuum pump) is configured and operative to remove (vent, pump out) gases 250 from inside the heating chamber 244, during the heating process, for obtaining therein an operating pressure in a range of between about 0.1 atmosphere (atm) [76.0 mm Hg], and about 2 atmospheres (atm) [1520 mm Hg].

Chemical Reaction Mass Transfer Conditions/Parameters, Characteristics

In exemplary embodiments, the heating unit 220, in general, and the heating device 240 (including the heating chamber 244), in particular, are configured and operative to (forcibly) transfer (transport, move) the heated mixture 218 of the solid calcium hydroxide 212 and the solid waste 204, and the solid reaction products 222 (consisting essentially of the solid calcium bromide [CaF$_2$ (salt)], as well as relatively small amounts of other possible solid reaction products formed therefrom), during the heating process (for example, from start to finish of the heating process), through the heating device 240 (the heating chamber 244), from the heating device input assembly 242, through and out of the heating chamber 244, and towards and into the heating device output assembly 246. For effecting such (forced) mass transfer (transport, moving) of the heated mixture 218 (and solid reaction products 222 formed therefrom) through the heating device 240 (heating chamber 244) during the heating process, in exemplary embodiments, the heating unit 220, in general, and the heating device 240 (including the heating chamber 244), in particular, include one or more forced mass transfer assemblies, or/and forced mass transfer mechanisms, herein, generally referred to as one or more forced mass transfer devices.

For example, as shown in FIG. 2, heating unit 220 includes a forced mass transfer device, for example, forced mass transfer device 260, included as part of, and located inside, the heating device 240 (via inside the heating chamber 244), and configured to (forcibly) transfer (transport, move) the heated mixture 218 of the solid calcium hydroxide 212 and the solid waste 204, and solid reaction products 222 formed therefrom, during the heating process (for example, from start to finish of the heating process), through the heating device 240 (the heating chamber 244), from the heating device input assembly 242, through and out of the heating chamber 244, and towards and into the heating device output assembly 246. For example, in FIG. 2, such forced mass transfer (transport, movement) of the heated mixture 218, and of the heated solid reaction products 222 formed therefrom, during the heating process, through the heating device 240 (the heating chamber 244), is represented by the three dashed line arrows surrounding the forced mass transfer device 260.

In exemplary embodiments, the forced mass transfer device 260 includes one or more controllably rotatable components (structures, elements) that are configured and operative to controllably rotate, for example, in the form of a controllably rotatable screw or similarly geometrically configured and operative type of rotatable component (structure, element). In exemplary embodiments of the forced mass transfer device 260, each of the one or more controllably rotatable components (structures, elements) is configured and operative to rotate wherein the operating speed or rate of rotation, during the heating process (for example, from start to finish of the heating process), is in a range of between about 1 round per minute (rpm) and about 30 rounds per minute (rpm).

In exemplary embodiments of the forced mass transfer device 260, the controllably rotatable screw or similarly configured and operative type of rotatable component (structure, element) is made of one or more types or kinds of (inert, non-reactive) material(s), for example, high grade stainless steel, which is substantially inert or non-reactive, and does not chemically affect (i.e., chemically react with, or cause chemical reaction of) the heated mixture 218 of the solid calcium hydroxide 212 and the solid waste 204, or the heated solid reaction products 222 formed therefrom, during the heating process. Such exemplary material(s) of construction of the rotatable screw prevents, or at least minimizes, possible undesirable and unwanted side reactions which may take place during forced mass transfer of the various heated contents inside the heating chamber 244.

Chemical Reaction (Heating Chamber) Residence Time Conditions/Parameters, Characteristics For heating the mixture of the solid waste 204 and the solid calcium hydroxide 212, to thereby form the heated product including solid calcium bromide [$CaBr_2$ (salt)] 222, total residence time (time period) of the reactants and products, and therefore, of the chemical reaction, inside the heating chamber 244 of the heating device 240 is a function of several process operating conditions and parameters. Exemplary process operating conditions and parameters are as follows.

(i) Temperature and pressure conditions inside of the heating device 240 (heating chamber 244) during the heating process. Chemical reaction (heating chamber) residence time is a function of the chemical kinetics of the chemical reactions taking place during heating of the mixture 218 of the solid waste 204 and the solid calcium hydroxide 212 inside the heating chamber 244. In turn, chemical kinetics of the chemical reactions taking place inside the heating chamber 244 is a function of the operating temperature and operating pressure during the heating process.

(ii) Initial chemical composition or make-up of the solid waste 204, in terms of the initial relative amount or proportion of the bromine compounds in the solid waste 204.

(iii) Total amount or quantity (mass, weight, volume) of the mixture 218 of the solid waste 204 and the solid calcium hydroxide 212 fed into the heating device 240 (heating chamber 244) of the heating unit 220, which, in turn, is based on the initial amounts or quantities (masses, weights, volumes) of the solid waste 204 and of the solid calcium hydroxide 212 fed into and supplied to the mixing unit 216. For example, in exemplary embodiments, the initial amount or quantity (mass, weight) of the solid calcium hydroxide 212 fed into and supplied to the mixing unit 216 is based on supplying an amount or quantity of the solid calcium hydroxide 212 that corresponds to the stoichiometric equivalent of the amount or quantity of bromine contained in the bromine compounds of the solid waste 204.

(iv) Rate of forced mass transfer of the heated mixture 218 of the solid calcium hydroxide 212 and the solid waste 204, and solid reaction products (consisting essentially of solid calcium bromide) 222 formed therefrom, during the heating process, through the heating device 240 (the heating chamber 244), from the heating device input assembly 242, through and out of the heating chamber 244, and towards and into the heating device output assembly 246. In exemplary embodiments which include operation of a forced mass transfer device, such as forced mass transfer device 260, the rate of forced mass transfer of the heated mixture 218 and the solid reaction products 222 during the heating process, through the heating chamber 244, is a direct function of the operating speed or rate of rotation of the one or more controllably rotatable components (structures, elements) of the forced mass transfer device 260. In exemplary embodiments, during the heating process, the rate of forced mass transfer of the heated mixture 218 affects the rate(s) of heat transfer taking place inside the heated mixture 218, as well as throughout the heating chamber 244. This, in turn, may affect the chemical kinetics taking place during the heating process, which, in turn, may affect the overall chemical reaction (heating chamber) residence time.

Actual observed chemical reaction (heating chamber) total residence time will be some function of the above described exemplary process operating conditions and parameters. In exemplary embodiments, for heating the mixture of the solid waste 204 and the solid calcium hydroxide 212, to thereby form the heated product including solid calcium bromide [$CaBr_2$ (salt)] 222, chemical reaction (heating chamber) residence time (time period) inside the heating chamber 244 of the heating device 240 is in a range of between about 20 minutes (min) and about 60 minutes (min), for example, about 40 minutes (min).

Chemical Reaction Exit Conditions/Parameters, Characteristics

In exemplary embodiments, the heated product 222 (consisting essentially of solid calcium bromide [$CaBr_2$ (salt)]) formed in the heating unit 220 during the heating process, exits the heating chamber 244 of the heating device 240, by passing through heating device output assembly 246. In exemplary embodiments, the heated product 222 passes through an exit flange and then through an exit valve assembly or mechanism, whereupon the heated product 222 is collected for further processing, or/and use.

For effecting such passage and exiting of the solid calcium bromide 222 out from the heating chamber 244 of the heating device 240, in exemplary embodiments, the heating device output assembly 246 includes, or is operatively connected to, an exit flange. Alternatively, or additionally, in exemplary embodiments, the heating device output assembly 246 includes, or is operatively connected to, an exit valve assembly or mechanism, for example, exit valve assembly or mechanism 262.

In exemplary embodiments, the exit valve assembly or mechanism, for example, exit valve assembly or mechanism 262, is configured and operative to be controllably opened and closed in a controllable timed manner, for example, according to a pre-determined open/close timing schedule, to thereby enable quick passage therethrough of the heated product 222 with minimal entry of air back into the heating chamber 244. In exemplary embodiments, the exit valve assembly or mechanism 262 includes a knife valve, or/and a double gate valve, that is/are configured and operative to be controllably opened and closed in a controllable timed manner, for example, according to a pre-determined open/close timing schedule, to thereby enable quick passage therethrough of the heated product 222 with minimal entry of air back into the heating chamber 244.

Following the heating process, for example, after exiting the heating unit 220, for example, via the heating device output assembly 246, and passing through the exit valve assembly or mechanism 262, the (hot) heated product 222 including solid calcium bromide [$CaBr_2$ (salt)] is transferred (for example, via chemical [solids] transport line 264) to, and collected, for example, in a product collection vessel or container 266. In exemplary embodiments, the collected (hot) heated product 222 including solid calcium bromide [$CaBr_2$ (salt)] is allowed to cool down to room temperature under ambient air. After cooling, the collected (cooled) heated product 222 including solid calcium bromide [$CaBr_2$ (salt)] can be stored for future use, or/and subjected to further processing and use thereof. Alternatively, in exemplary embodiments, the collected (hot) heated product 222 including solid calcium bromide [$CaBr_2$ (salt)], while still hot, is directly subjected to further processing, for example, as illustratively described hereinabove, via exemplary steps (procedures/processes) 130 and 134, or/and via exemplary steps (procedures/processes) 138 and 142, for example, as presented in FIG. 1B.

Chemical Reaction Product Characteristics

As previously stated hereinabove, in exemplary embodiments, an amount or quantity of the solid calcium hydroxide 212 is supplied (in a stoichiometric equivalent) to the solid waste 204 such that chemical reaction (occurring inside the heating unit 220) between the two reactants, solid calcium hydroxide 212 and solid waste 204, goes to full, or nearly full, completion, for forming the heated product 222 consisting essentially of solid calcium bromide [$CaBr_2$ (salt)], whereby, essentially the entire initial amount or quantity of each reactant is essentially fully consumed, while leaving essentially no excess of either reactant, as well as forming essentially no side products. Accordingly, in exemplary embodiments, upon completion of the heating process, the chemical reaction product profile/distribution of the heated product 222 consists essentially of pure (nearly 100%) (white) solid calcium bromide [$CaBr_2$ (salt)]. Essentially all the bromine compounds present in the initially provided solid waste 204 reacted with the initially supplied solid calcium hydroxide [$Ca(OH)_2$] 212, for forming the product of (white) solid calcium bromide [$CaBr_2$ (salt)].

In exemplary embodiments, the bromine recovery process results in producing a relatively small amount of waste. For example, upon completion of the heating process, the only waste produced is a relatively small amount of water condensate formed inside the gas removing (venting) device, for example, gas removing (venting) device 252 (vacuum pump), which removed (vented, pumped out) gases 250 formed inside the heating chamber 244 of the heating device 240 during the heating process. Such water condensate may contain a relatively small amount of salt(s) in addition to calcium bromide [$CaBr_2$ (salt)], and may also contain a relatively small amount of liquid phase hydrogen bromide (hydrobromic acid) [HBr (liquid)]. In exemplary embodiments, such water condensate accounts for less than about 5% (weight/weight) of the total amount of the mixture 218 (solid waste 204+solid calcium hydroxide 212) which enters into the heating chamber 244 of the heating unit 220. Accordingly, the bromine recovery process is relatively highly efficient in terms of producing relatively small amounts of waste or/and side products.

Processing the Solid Calcium Bromide//Chemical Processing Unit

As shown in FIG. 2, in exemplary embodiments, part, or the entirety, of the collected (and cooled or still hot) heated product including solid calcium bromide [$CaBr_2$ (salt)] 222 is subjected to further processing, for example, by a chemical processing unit, for example, chemical processing unit 224. In exemplary embodiments, chemical processing unit 224 is operatively connected (for example, via product collection vessel or container 266 and chemical [solids] transport line 268) to the heating unit 220, and utilized to process the collected heated product 222, to thereby form bromine [$Br_2$] 226.

Reference is again made to FIG. 1B, a flow diagram of exemplary steps (procedures/processes) of the bromine recovery method step (procedure/process) 120 of processing the heated product including solid calcium bromide [$CaBr_2$ (salt)] 222, for example, as formed via the exemplary embodiment 100 of the method for recovering bromine from solid waste containing bromine compounds presented in FIG. 1A.

In exemplary embodiments of the bromine recovery method, the step (procedure/process) 120 of processing the (cooled or hot) heated product including solid calcium bromide may include exemplary steps (procedures/processes) 130 and 134, for example, as presented in FIG. 1B. In 130, there is dissolving the heated product (of solid calcium bromide [$CaBr_2$ (salt)]) 222 in water, thereby forming an aqueous solution of calcium bromide [$CaBr_2$ (aqueous salt)]. In 134, there is subjecting the calcium bromide aqueous solution to a separation procedure, thereby separating out and obtaining the bromine [$CaBr_2$] 226.

In exemplary embodiments, the step (procedure/process) 120 of processing the (cooled or hot) heated product (of solid calcium bromide [$CaBr_2$ (salt)]) 222, instead of (i.e., alternatively to), or, in addition to (i.e., separately, in parallel or concurrently), including steps (procedures/processes) 130 and 134, may include exemplary steps (procedures/processes) 138 and 142, for example, as presented in FIG. 1B. In 138, there is heating the (cooled or hot) heated product (of solid calcium bromide [$CaBr_2$ (salt)] 222 in presence of oxygen, thereby forming solid calcium oxide [CaO (solid)] and gaseous bromine [$Br_2$ (gas)] 226. In 142, there is condensing the gaseous bromine, thereby forming liquid bromine [$Br_2$ (liquid)] 226.

In exemplary embodiments of the bromine recovery system, such as exemplary embodiment 200 shown in FIG. 2, chemical processing unit 224 is configured and operative to perform the exemplary steps (procedures/processes) of the bromine recovery method step (procedure/process) 120 of processing the heated product (of solid calcium bromide [$CaBr_2$ (salt)] 222, so as to form and obtain the bromine [$Br_2$] 226.

For example, chemical processing unit 224 includes the necessary equipment and apparatuses for dissolving the (cooled or hot) heated product (of solid calcium bromide [$CaBr_2$ (salt)]) 222 in water, thereby forming an aqueous solution of calcium bromide [$CaBr_2$ (aqueous salt)], as well as for subjecting the calcium bromide aqueous solution to a separation procedure, for example, involving, precipitation, distillation or/and extraction, among other possible separation procedures, thereby separating out and obtaining the bromine [$Br_2$] 226. Alternatively, or additionally, for example, chemical processing unit 224 includes the necessary equipment and apparatuses for heating the (cooled or hot) heated product (of solid calcium bromide [$CaBr_2$ (salt)]) 222 in presence of oxygen, thereby forming solid calcium oxide [CaO (solid)] and gaseous bromine [$Br_2$ (gas)] 226, as well as condensing the gaseous bromine, thereby forming liquid bromine [$Br_2$ (liquid)] 226.

Controlling Operation of, and Processing Data-Information Associated With the Method and System//Process Control/Data-Information Processing Unit In exemplary embodiments of the invention, such as exemplary embodiment 100 of the bromine recovery method presented in FIGS. 1A and 1B, and such as exemplary embodiment 200 of the bromine recovery system presented in FIG. 2, via process control/data-information processing unit 228, there is controlling operation of, and processing data-information associated with, method steps (procedures/processes), and related equipment used for performing: providing the solid waste 204 containing the bromine compounds, providing a supply of solid calcium hydroxide 212, mixing the solid waste 204 and the solid calcium hydroxide 212, thereby forming a mixture 218 thereof, heating the mixture 218 in a chemical reducing (non-oxidizing) environment (i.e., an environment absent of chemical oxidation conditions, and with presence of chemical reduction conditions), thereby forming a heated product 222 including solid calcium bromide, processing the heated product 222 including solid calcium bromide, so as to form bromine 226.

In FIG. 1A, such controlling and processing of the bromine recovery method steps (procedures/processes), and related equipment used for performing thereof, are schematically represented by dashed line 126 extending from 124 and connecting to dashed lines 126a, 126b, 126c, 126d, and 126e, extending from the respective method steps (procedures/processes) 104, 108, 112, 116, and 120. In FIG. 2, such controlling and processing of bromine recovery method steps (procedures/processes), and related equipment used for performing thereof, as well as operative connections and configurations between the process control/data-information processing unit 226 and each of the other bromine recovery system process units (and components therein), namely, the solid waste input unit 206, the solid calcium hydroxide supply unit 210, the mixing unit 216, the heating unit 220, and the chemical processing unit 224, are schematically represented by the double headed dotted line arrows 230 surrounding process control/data-information processing unit 228.

In exemplary embodiments, such as exemplary embodiment 200, the bromine recovery system, in general, and process control/data-information processing unit 228, in particular, includes automatic electrical or/and electronic operating, controlling, and monitoring (measuring) of the numerous operating parameters and conditions of system process units, components, assemblies, mechanisms, and operative connections.

In exemplary embodiments, electrical or/and electronic input/output, feedforward and feedback transmission and reception of electrical or/and electronic control data, information, and command, communication signals between system process units, components, and assemblies, mechanisms, and, power supply and process control equipment, are provided by (wired or/and wireless) electrical or/and electronic input/output control data, information, and command, communications lines, which may include, for example, cables, bundles, or/and buses of wires.

In exemplary embodiments, operative connections and configurations between the process control/data-information processing unit 228, and each of the other system process units (and components therein), namely, the solid waste input unit 206, the solid calcium hydroxide supply unit 210, the mixing unit 216, the heating unit 220, and the chemical processing unit 224, are in the form of a (wired or/and wireless) electrical or/and electronic network of input/output data-information control signal communications lines, for example, in FIG. 2, also represented by double headed dotted line arrows 230.

Additional Exemplary Structural, Functional, and Operational Features of System Process Units, and Components Thereof Following are described additional exemplary structural, functional, and operational features of some embodiments of the bromine recovery system, such as exemplary embodiment 200 shown in FIG. 2. These relate to the various system process units (and components therein), namely, solid waste input unit 206, solid calcium hydroxide supply unit 210, mixing unit 216, heating unit 220, and chemical processing unit 224, and to the numerous operative connections therebetween.

In exemplary embodiments, any one or more of the process units, components, assemblies, or/and mechanisms, may include its own separate (local) power supply and (local) process control equipment, whereby, for example, such localized power supply and process control equipment is operatively connected to, and configured to operate in conjunction with, process control/data-information processing unit 228. Alternatively, any one or more of the process units, components, assemblies, or/and mechanisms, may be directly operatively connected to a centralized (global) power supply, for example, which is operatively connected to, or associated with, centralized (global) process control/data-information processing unit 228.

In exemplary embodiments, such power supply is a multi-functional, multi-operational type of power supply, configured to supply power according to any of various different types of spatial or/and temporal power configurations, modes, formats, schemes, and schedules, involving synchronous, serial (sequential), periodic, non-periodic, or asynchronous, supply of power in the form of dc or/and ac voltage or/and current, to the system process units, components, assemblies, mechanisms, of the bromine recovery system. Such power supply is configured to operate in conjunction with process control/data-information processing unit 228.

In exemplary embodiments, the bromine recovery system includes appropriate solids or/and fluid (mass) transfer equipment, such as pipes, tubes, connecting elements, adaptors, fittings, pumps, valves, vents, fans, switches, and, fluid (mass) flow controlling, metering, sensing, and measuring devices, such as solids or/and fluid (mass) flow controllers, meters, and sensors, as well as associated mechanisms, assemblies, components, and elements thereof, which are made of suitable materials, for fully enabling system process units, components, and assemblies, to perform the herein illustratively described functions and operations.

In exemplary embodiments, the bromine recovery system includes appropriate heating and heat transfer equipment, such as heaters, heating jackets, heating elements, insulation, pipes, tubes, connecting elements, adaptors, fittings, valves, vents, fans, switches, and, heat (temperature) controlling, sensing, and measuring devices, such as temperature controllers, sensors, and thermocouples, as well as associated mechanisms, assemblies, components, and elements thereof, which are made of suitable materials, for frilly enabling system process units, components, and assemblies, to perform the herein illustratively described functions and operations.

Another aspect of some embodiments of the present invention is a method for manufacturing solid calcium bromide from solid waste containing bromine compounds.

FIG. 3 is a flow diagram of an exemplary embodiment (indicated as, and referred to by, reference number 300), including the indicated exemplary steps (procedures/processes) thereof, of a method for manufacturing solid calcium bromide [$CaBr_2$ (salt)] from solid waste containing bromine compounds. Herein, the exemplary embodiment 300 of the method for manufacturing solid calcium bromide [$CaBr_2$ (salt)] from solid waste containing bromine compounds is also referred to as solid calcium bromide manufacturing method 300.

As shown in FIG. 3, in a non-limiting manner, and in some embodiments, such as exemplary embodiment 300, the solid calcium bromide manufacturing method includes the following exemplary steps (procedures/processes).

In 304, there is providing the solid waste containing the bromine compounds.

In 308, there is providing a supply of solid calcium hydroxide [$Ca(OH)_2$ (solid)].

In 312, there is mixing the solid waste and the solid calcium hydroxide, thereby forming a mixture thereof.

In 316, there is heating the mixture in a chemical reducing (non-oxidizing) environment (i.e., an environment absent of chemical oxidation conditions, and with presence of chemical reduction conditions), so as to form solid calcium bromide [$CaBr_2$ (salt)].

In exemplary embodiments of the invention, performance of exemplary steps (procedures/processes) 304, 308, 312, and 316, results in manufacturing solid calcium bromide from the solid waste containing the bromine compounds.

In exemplary embodiments, solid calcium bromide manufacturing method 300 additionally includes exemplary step (procedure/process) 320, wherein there is controlling operation of, and processing data-information associated with, method steps (procedures/processes) 304, 308, 312, and 316, and related equipment used for performing thereof. More specifically, in 320, there is controlling operation of, and processing data-information associated with, method steps (procedures/processes), and related equipment used for performing: 304—providing the solid waste containing the bromine compounds; 308—providing a supply of solid calcium hydroxide; 312—mixing the solid waste and the solid calcium hydroxide, thereby forming a mixture thereof; and 316—heating the mixture in a chemical reducing (non-oxidizing) environment, so as to form solid calcium bromide. In FIG. 3, such controlling and processing of solid calcium bromide manufacturing method 300 steps (procedures/processes), and related equipment used for performing thereof, are schematically represented by dashed line 322 extending from 320 and connecting to dashed lines 322a, 322b, 322c, and 322d, extending from the respective method steps (procedures/processes) 304, 308, 312, and 316.

Another aspect of some embodiments of the present invention is a system for manufacturing solid calcium bromide from solid waste containing bromine compounds.

The system for manufacturing solid calcium bromide from solid waste containing bromine compounds, in a non-limiting manner, and in some embodiments, includes: a solid waste input unit, a solid calcium hydroxide supply unit, a mixing unit, and a heating unit. In some embodiments, the calcium bromide manufacturing system additionally includes a process control/data-information processing unit.

The exemplary embodiment 200 of the system shown in FIG. 2, is, in a non-limiting manner, suitable for implementing some embodiments of the method for manufacturing solid calcium bromide from solid waste containing bromine compounds, such as exemplary embodiment 300 of the solid calcium bromide manufacturing method presented in FIG. 3. Similarly, the exemplary embodiment 300 of the method presented in FIG. 3, is, in a non-limiting manner, suitable for implementing some embodiments of the system for manufacturing solid calcium bromide from solid waste containing bromine compounds, such as exemplary embodiment 200 of a solid calcium bromide manufacturing system presented in FIG. 2. Herein, the exemplary embodiment 200 of a system for manufacturing solid calcium bromide from solid waste containing bromine compounds is also referred to as the solid calcium bromide manufacturing system.

Hereinabove additional illustrative description and details of some embodiments of the method, and some embodiments of the system, for recovering bromine from solid waste containing bromine compounds, for example, as presented in FIGS. 1A and 2, are similarly applicable for implementing and practicing some exemplary embodiments of a method and system for manufacturing solid calcium bromide from solid waste containing bromine compounds, for example, as presented in FIGS. 3 and 2, respectively.

A particular difference regards the bromine recovery method and system which include the exemplary step (procedure/process) 120 of processing the heated product including solid calcium bromide [$CaBr_2$ (salt)], for example, via the chemical processing unit 224, so as to form bromine [$Br_2$]. Such exemplary step (procedure/process) of forming bromine is unnecessary in exemplary embodiments of the solid calcium bromide manufacturing method and system, since the exemplary step (procedure/process) 316 of heating the mixture (of solid waste and solid calcium hydroxide), for example, via the heating unit 220, in a chemical reducing (non-oxidizing) environment, results in forming the desired reaction (manufactured) product, namely, solid calcium bromide [$Ca_2$ (salt)].

Similar to some embodiments of the bromine recovery process, some embodiments of the solid calcium bromide manufacturing process are highly efficient in terms of producing relatively small amounts of waste or/and side products.

In exemplary embodiments of the calcium bromide manufacturing method and system, for example, as shown in FIGS. 2 and 3, following the heating process, for example, via the heating device output assembly 246, and passing through the exit valve assembly or mechanism 262, the (hot) solid calcium bromide [$CaBr_2$ (salt)] product 222 is transferred (for example, via chemical [solids] transport line 264) to, and collected, for example, in a product collection vessel or container 266. In exemplary embodiments, the (hot) solid calcium bromide [$CaBr_2$ (salt)] product 222 is allowed to cool down to room temperature under ambient air. After cooling, the collected (cooled) solid calcium bromide [$CaBr_2$ (salt)] product 222 can be stored for future use.

For example, the collected solid calcium bromide [$CaBr_2$ (salt)] product 222 can be used as a chemical reagent in numerous different types and kinds of chemical reactions and commercial manufacturing processes. Another exemplary use involves dissolving the collected solid calcium bromide [$CaBr_2$ (salt)] product 222 in water, to thereby form an aqueous solution of calcium bromide [$CaBr_2$ (aqueous salt)], which can be used in commercial drilling fluids. The manufactured solid calcium bromide [$CaBr_2$ (salt)] product 222, either in an 'as is' solid salt form, or in an aqueous solution form, can be also used in a wide variety of applications, for example, in the medical field (as an ingredient in medicines/medications), in the food industry (as an ingredient in foods, for example, as a food preservative), photographic applications, and in the field of fire prevention (for example, as a flame (fire) retardant, or as an ingredient in flame (fire) retardant materials.

Additional Embodiments, Implementations, Practices, and Applications Thereof

Additional embodiments, implementations, practices, and applications, of the invention are as follows.

In a non-limiting manner, some embodiments of the invention may be suitable for recovering other types of halogens from solid waste containing compounds of such halogens (i.e., halogenated organic or/and inorganic compounds).

For example, since bromine [$Br_2$] is a member in the halogen group of elements, some embodiments of the invention may be suitable for recovering other halogens, such as fluorine [$F_2$], chlorine [$Cl_2$], or/and iodine [$I_2$], from solid waste containing compounds of such halogens, singly, or in combination.

Additionally, in a non-limiting manner, since calcium [Ca] is a member in the alkaline earth group of elements, some embodiments of the invention may be suitable for manufacturing other types of alkaline earth type bromine salts (alkaline earth bromides), singly, or in combination.

For example, hereinabove illustratively described exemplary embodiments of the invention involve use of the solid hydroxide form of the alkaline earth element calcium, namely, solid calcium hydroxide [$Ca(OH)_2$ (solid)] (lime), for being mixed with the solid waste containing bromine compounds, for forming the alkaline earth (calcium) bromide salt, namely, solid calcium bromide [$CaBr_2$ (salt)]. Exemplary embodiments of the invention to may be implemented or practiced by using the solid hydroxide form of other alkaline earth elements, such as solid beryllium hydroxide [$Be(OH)_2$ (solid)], solid magnesium hydroxide [$Mg(OH)_2$ (solid)], solid strontium hydroxide [$Sr(OH)_2$ (solid)], or/and solid barium hydroxide [$Ba(OH)_2$ (solid)], for being mixed with the solid waste, for forming the respective alkaline earth bromide salt, namely, beryllium bromide [$BeBr_2$ (salt)], magnesium bromide [$MgBr_2$ (solid)], strontium bromide [$SrBr_2$ (solid)], or/and barium bromide [$BaBr_2$ (solid)].

Each of the following terms written in singular grammatical form: 'a', 'an', and 'the', as used herein, means 'at least one', or 'one or more'. Use of the phrase 'one or more' herein does not alter this intended meaning of 'a', 'an', or 'the'. Accordingly, the terms 'a', 'an', and 'the', as used herein, may also refer to, and encompass, a plurality of the stated entity or object, unless otherwise specifically defined or stated herein, or, unless the context clearly dictates otherwise. For example, the phrases: 'a unit', 'a device', 'an assembly', 'a mechanism', 'a component', 'an element', and 'a step or procedure', as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: 'includes', 'including', 'has', 'having', 'comprises', and 'comprising', and, their linguistic/grammatical variants, derivatives, or/and conjugates, as used herein, means 'including, but not limited to', and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase 'consisting essentially of'.

Each of the phrases 'consisting of' and 'consists of', as used herein, means 'including and limited to'.

The phrase 'consisting essentially of', as used herein, means that the stated entity or item (system, system unit, system sub-unit, device, assembly, sub-assembly, mechanism, structure, component, element, or, peripheral equipment, utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional 'feature or characteristic' being a system unit, system sub-unit, device, assembly, sub-assembly, mechanism, structure, component, or element, or, peripheral equipment, utility, accessory, or material, step or procedure, sub-step or sub-procedure), but only if each such additional 'feature or characteristic' does not materially alter the basic novel and inventive characteristics or special technical features, of the claimed entity or item.

The term 'method', as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably. For example, for stating or describing the numerical range of room temperature, the phrase 'room temperature refers to a temperature in a range of between about 20° C. and about 25° C.', and is considered equivalent to, and meaning the same as, the phrase 'room temperature refers to a temperature in a range of from about 20° C. to about 25° C.'.

The term 'about', as used herein, refers to ±10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment, may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

All publications, patents, and or/and patent applications, cited or referred to in this disclosure are herein incorporated in their entirety by reference into the specification, to the same extent as if each individual publication, patent, or/and patent application, was specifically and individually indicated to be incorporated herein by reference. In addition, citation or identification of any reference in this specification shall not be construed or understood as an admission that such reference represents or corresponds to prior art of the present invention. To the extent that section headings are used, they should not be construed as necessarily limiting.

What is claimed is:

1. A method for recovering bromine from solid waste containing bromine compounds, the method comprising:
    providing the solid waste containing the bromine compounds;
    providing a supply of solid calcium hydroxide;
    mixing the solid waste and said solid calcium hydroxide, thereby forming a mixture thereof;
    heating said mixture in a chemical reducing environment, for forming a heated product comprising solid calcium bromide; and
    processing said heated product, so as to form bromine.

2. The method of claim 1, wherein said heating is performed with an operating temperature in a range of between about 400° C. and about 800° C.

3. The method of claim 1, wherein said heating is performed with an operating pressure in a range of between about 0.1 atmosphere, and about 2 atmospheres.

4. The method of claim 1, wherein said heating includes removing gases formed therefrom.

5. The method of claim 1, wherein said heating includes forcibly transferring and moving said heated mixture, and said heated product formed therefrom, from start to finish of said heating.

6. The method of claim 5, wherein said forcibly transferring and moving is performed using a forced mass transfer device.

7. The method of claim 6, wherein said forced mass transfer device includes one or more controllably rotatable components configured and operative to controllably rotate with an operating speed or rate of rotation in a range of between about 1 round per minute (rpm) and about 30 rounds per minute (rpm).

8. The method of claim 1, wherein said processing includes heating said heated product of solid calcium bromide in presence of oxygen, thereby forming solid calcium oxide and gaseous bromine.

9. The method of claim 8, further comprising condensing said gaseous bromine, thereby forming liquid bromine.

10. A method for manufacturing solid calcium bromide from solid waste containing bromine compounds, the method comprising:
    providing the solid waste containing the bromine compounds;
    providing a supply of solid calcium hydroxide;
    mixing the solid waste and said solid calcium hydroxide, thereby forming a mixture thereof; and
    heating said mixture in a chemical reducing environment, so as to form solid calcium bromide.

11. The method of claim 10, wherein said heating is performed with an operating temperature in a range of between about 400° C. and about 800° C.

12. The method of claim 10, wherein said heating is performed with an operating pressure in a range of between about 0.1 atmosphere, and about 2 atmospheres.

13. The method of claim 10, wherein said heating includes removing gases formed therefrom.

14. The method of claim 10, wherein said heating includes forcibly transferring and moving said heated mixture from start to finish of said heating.

15. The method of claim 14, wherein said forcibly transferring and moving said heated mixture is performed using a forced mass transfer device.

16. The method of claim 15, wherein said forced mass transfer device includes one or more controllably rotatable components configured and operative to controllably rotate with an operating speed or rate of rotation in a range of between about 1 round per minute (rpm) and about 30 rounds per minute (rpm).

17. The method of claim 1, wherein said heating comprises venting hydrogen bromide formed in said heating step.

18. The method of claim 17, wherein said heating is comprises venting hydrogen bromide formed in said heating step.

* * * * *